(12) United States Patent
Babinsky et al.

(10) Patent No.: US 9,162,764 B2
(45) Date of Patent: Oct. 20, 2015

(54) CRAFT AND METHOD FOR ASSEMBLING CRAFT WITH CONTROLLED SPIN

(75) Inventors: Holger Babinsky, Cambridge (GB); Simon McIntosh, Cambridge (GB); Lee Whitcher, Cambridge (GB); Steve Potter, Cambridge (GB)

(73) Assignee: AESIR LIMITED, Cambridge (GB)

( * ) Notice: Subject to any disclaimer, the term of this patent is extended or adjusted under 35 U.S.C. 154(b) by 583 days.

(21) Appl. No.: 12/792,494

(22) Filed: Jun. 2, 2010

(65) Prior Publication Data

US 2012/0068021 A1 Mar. 22, 2012

(30) Foreign Application Priority Data

Jul. 6, 2009 (GB) .................................. 0911667.4

(51) Int. Cl.
*B64C 29/00* (2006.01)
*B64C 39/06* (2006.01)
*B63C 11/42* (2006.01)
*B63G 8/16* (2006.01)
*B63H 11/00* (2006.01)

(52) U.S. Cl.
CPC ............... *B64C 39/064* (2013.01); *B63C 11/42* (2013.01); *B63G 8/16* (2013.01); *B63H 2011/002* (2013.01); *Y10T 29/49826* (2015.01)

(58) Field of Classification Search
USPC .......... 244/12.1, 12.2, 12.3, 12.4, 12.5, 23 C, 244/23 A
See application file for complete search history.

(56) References Cited

U.S. PATENT DOCUMENTS

| 2,927,746 | A | * | 3/1960 | Mellen | ........................ | 244/12.2 |
| 2,996,266 | A | * | 8/1961 | Rebasti | ........................ | 244/12.2 |
| 2,997,254 | A | * | 8/1961 | Mulgrave et al. | ............ | 244/12.2 |
| 3,051,415 | A | | 8/1962 | Frost et al. | | |
| 3,104,853 | A | * | 9/1963 | Klein | ........................ | 244/12.2 |
| 3,224,711 | A | * | 12/1965 | Warren et al. | ................ | 244/23 C |
| 3,572,613 | A | * | 3/1971 | Porter | ........................ | 244/12.2 |
| 4,795,111 | A | * | 1/1989 | Moller | ........................ | 244/23 C |
| 5,203,521 | A | | 4/1993 | Day | | |
| 5,295,643 | A | * | 3/1994 | Ebbert et al. | ................. | 244/7 B |
| 5,803,199 | A | | 9/1998 | Walter | | |
| 7,857,256 | B2 | * | 12/2010 | Hatton | ........................ | 244/23 C |
| 2008/0191101 | A1 | | 8/2008 | Hatton et al. | | |

(Continued)

FOREIGN PATENT DOCUMENTS

| GB | 2424400 | 9/2006 |
| GB | 2452255 | 3/2009 |
| JP | 61122447 | 6/1986 |

(Continued)

OTHER PUBLICATIONS

International Search Report for PCT/GB10/05114 filed Jul. 6, 2009 dated May 26, 2011.

(Continued)

*Primary Examiner* — Brian M O'Hara
*Assistant Examiner* — Keith L Dixon
(74) *Attorney, Agent, or Firm* — Fleit Gibbons Gutman Bongini & Bianco PL; Martin Fleit; Paul D. Bianco

(57) ABSTRACT

This invention relates to a craft designed to move through or on a surface of a fluid. It is believed to be principally of use in relation to airborne craft and missiles but the theory behind the invention is equally applicable for example to submarines.

21 Claims, 7 Drawing Sheets

(56) References Cited

U.S. PATENT DOCUMENTS

2008/0223979 A1* 9/2008 Schlunke ............... 244/12.2
2009/0242689 A1* 10/2009 Hatton et al. ............ 244/12.2

FOREIGN PATENT DOCUMENTS

| WO | 0047470 | 8/2000 |
| WO | 2006100526 A2 | 8/2006 |
| WO | 2011/004186 | 1/2011 |

OTHER PUBLICATIONS

British Search Report for GB0911667.4 dated Dec. 2009.
International Preliminary Report on Patentability for PCT/GB10/05114 filed Jul. 6, 2009 dated Jan. 10, 2012.
English language summary of Chinese office action for CN 201080030592.1, national stage of CPT/GB10/51114, dated Mar. 21, 2014.

* cited by examiner

CRAFT AND METHOD FOR ASSEMBLING CRAFT WITH CONTROLLED SPIN

FIELD OF THE INVENTION

This invention relates to a craft designed to move through or on a surface of a fluid. It is believed to be principally of use in relation to airborne craft and missiles but the theory behind the invention is equally applicable for example to submarines.

BACKGROUND OF THE INVENTION

The invention arose in the design of a craft of the type in which a fan is used to direct a radial jet of air over a curved canopy. The canopy is shaped so as to divert the flow of air from a radial to an axial direction to produce lift. This invention deals with the problem of increasing lift.

It is known, eg from U.S. Pat. No. 5,203,521 that, in vehicles of this type, the turning of the fan also tends to produce an unwanted turning of the canopy. U.S. Pat. No. 5,203,521 relates to an aircraft having an upper deflector which deflects air from a fan onto an annular body. The deflector is supported onto the annular body by spacers or struts which form spoilers designed to give air from the fan a circumferential component of motion to counteract the spin cause by the propeller. Because U.S. Pat. No. 5,203,521 assumes that the air from the fan follows in a radial direction, the spoilers or struts have upstream portions which are angled, if away from the radial, in a direction opposite the direction of flow.

In U.S. Pat. No. 5,803,199 the unwanted turning is counteracted using trimming vanes located on the lift generating surface of the canopy.

More recently, as described in WO/2006/100526, it has been recognised that the air flowing from the fan tends to follow, depending on its velocity, a complex swirling trajectory over the canopy surface rather than a direct path in a vertical axial plane WO/2006/100526 describes a technique by which this phenomenon, in conjunction with fins on the canopy, can be used to prevent the abovementioned counter spin.

SUMMARY OF THE INVENTION

The present invention arose from a proposition that the abovementioned swirling action might have an adverse effect on lift.

According to a first aspect of the invention there is provided a Coanda craft comprising an impeller for generating a jet of fluid and means for causing the jet to flow over a lift producing surface being shaped and positioned so as to cause diversion of the jet from a radial towards an axial direction, the craft comprising an aerofoil control surface and means for adjusting the latter to prevent or control spin of the vehicle, characterised in that at least a portion of the aerofoil control surface is located upstream of the lift producing surface and that an upstream portion of the aerofoil control surface is angled away from a radial direction towards or inline with or beyond the direction of flow of fluid emanating from the impeller.

By employing the invention fluid flow is redirected from a direction having a circumferential component towards a radial direction before reaching the lift producing surface. In this way it is found to be possible to improve lift and also to prevent counter spin.

It has also been found that locating the vanes upstream allows control of turning effects to be achieved using smaller vane movement than required when the vane is located downstream on the lift generating surface.

A balance needs to be made between a large number of aerofoil control vanes (to maximise their effectiveness in diverting the airflow towards the radial direction) and a small number (to minimize drag). There may be some situations where it is best to have a relatively small number of vanes shaped to divert the flow to and beyond the radial in order to compensate for their reduced number.

In a preferred embodiment of the invention the craft comprises a shroud which extends circumferentially about the impeller so as to define a duct within which the impeller resides. The vanes may perform a dual function as struts supporting the shroud above a canopy which defines the lift generating surface.

To rotate the hinged portions of the vanes the craft maybe provided with an actuating system, the actuating system may be belt driven with each hinged vane having a belt engagement means to engage with the belt.

The actuating system may comprise multiple belts arranged to drive different sets of vanes. The belts may be used to control vanes spaced alternatively around the canopy so that the craft may still have sufficiently stability to land safely in the event that one of the belt drives fail. Where the vanes to be used to control pitch and roll the sets of vanes may be confined to different sectors of the canopy.

BRIEF DESCRIPTION OF THE DRAWINGS

The invention will now be described by way of example with reference to the following figure in which.

DETAIL DESCRIPTION OF THE INVENTION

Figure 1:
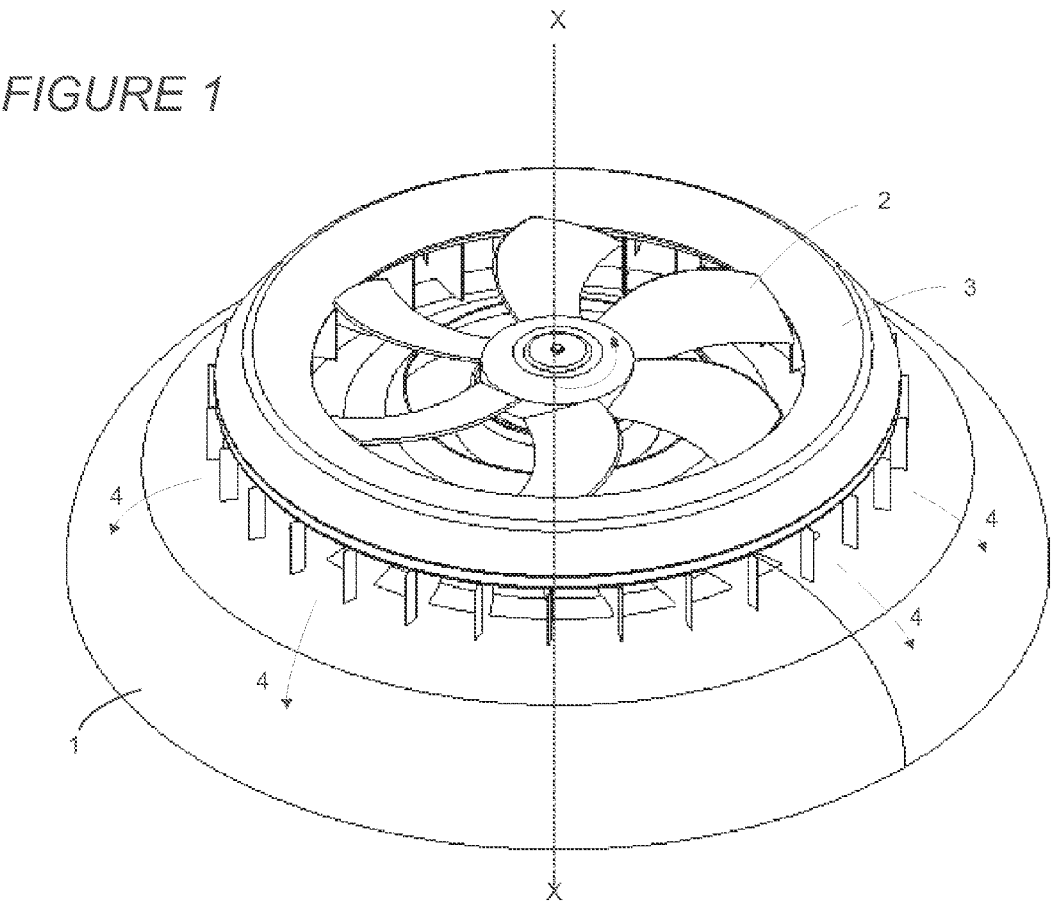
FIG. 1 is perspective view of a vertical take-off aircraft.

Referring to the figures there is shown a vertical take off aircraft having a canopy 1 defining an aerodynamic surface of double convex curvature and an axial fan 2, which, in this particular example, is driven anticlockwise as seen in FIG. 1. The fan 2 is driven by an engine or motor, not illustrated, housed within the canopy 1.

A shroud 3 is supported above the canopy and extends circumferentially around the fan 2 such as to define a duct within which the fan 2 is housed.

Air is drawn into the fan 2 from above the canopy along the axis as indicated by line X-X and is expelled as a jet over the curved surface of the canopy as indicated by arrows 4. By virtue of the Coanda effect the jet follows the curve of canopy 1, diverted from a plane of the fan normal to the axis X-X, towards the axial direction; and the jet finally parts from the canopy surface at its lower edge 5. This diversion of the jet towards the vertical axis generates vertical lift.

Figure 3A:
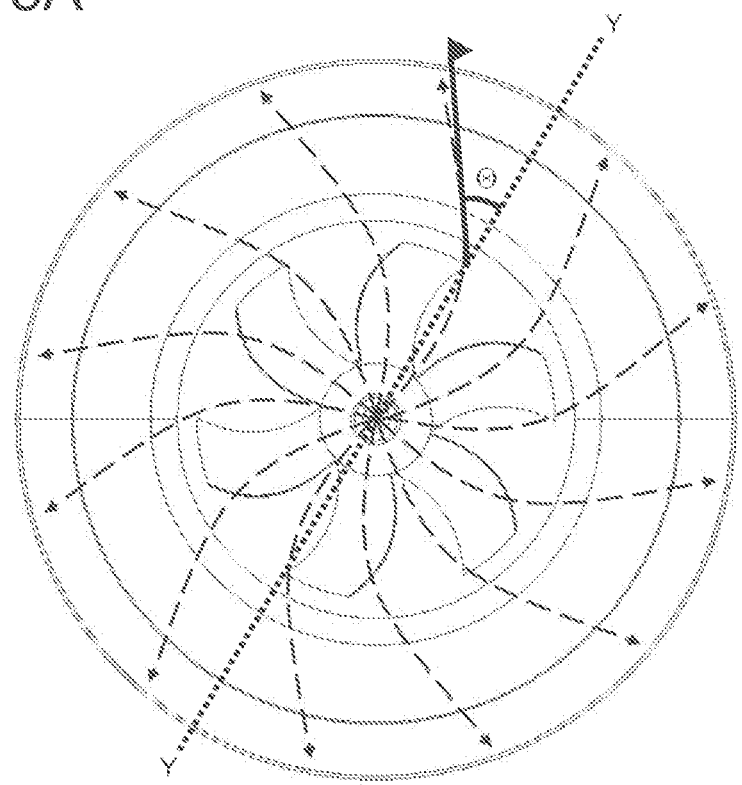
FIGS. 3A & 3B are plan views of a vertical take off aircraft with and without vanes 6.

Because of the rotary action of the fan 2, the air expelled from it has a circumferential velocity component which is greater at greater fan speeds. This circumferential component, or swirl angle, has a magnitude θ from the radial direction as shown in FIG. 3A.

Rotation of the fan 2 in the anticlockwise direction causes, by reaction, a corresponding moment of force tending to rotate the canopy 1 in a clockwise direction. This would cause the canopy 1 to spin out of control if remedial action were not taken.

Figure 2:
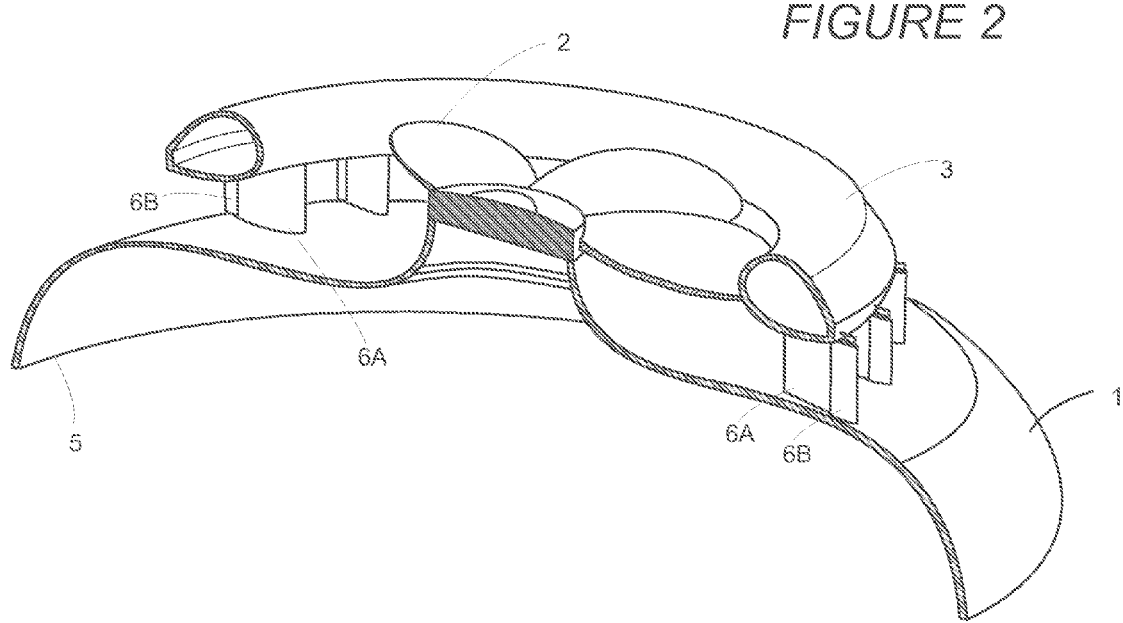
FIG. 2 is a perspective cut away view of the vertical take-off aircraft of FIG. 1

Interposed between shroud 3 and the canopy 1 are vanes 6 spaced circumferentially about the fan 2. As can be seen most clearly in FIG. 2, each vane 6 comprises a stator vane 6A and a hinged vane 6B. The stator vanes 6A act as struts upon which the shroud 3 is secured to the canopy 1. The hinged portion 6B is hinged to the free end of the stator vane 6A, radially distal from the fan 2.

Figure 3B:
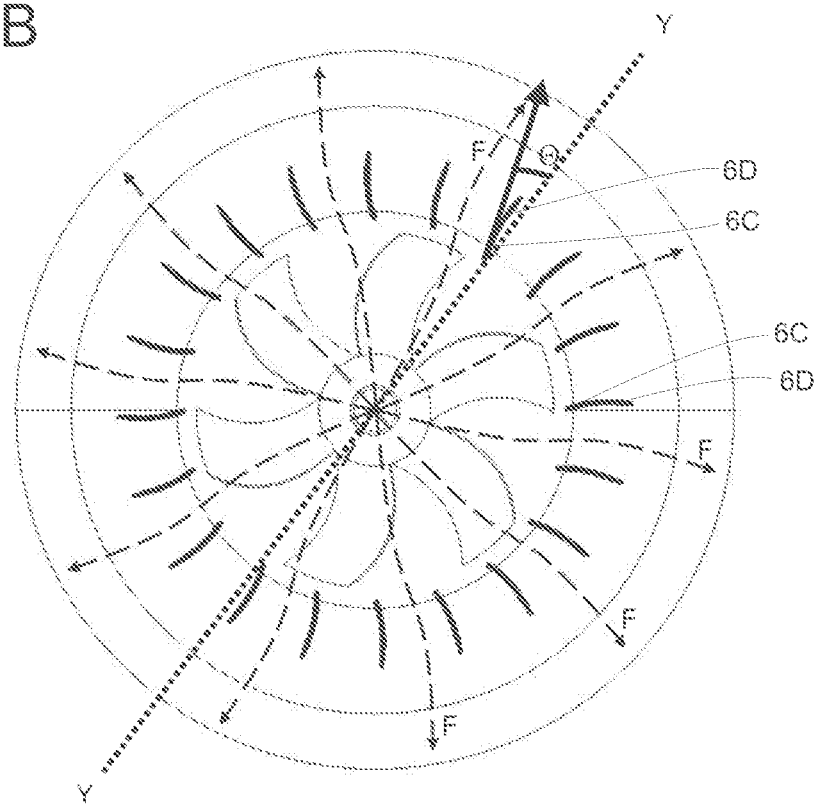

As illustrated in FIG. 3B the stator vanes 6A have a curved profile such as to define an upstream portion 6C angled away from the radial direction as indicated by line Y-Y, and a downstream portion 6D which is substantially radial. The upstream portion 6C is orientated so as to be aligned with the swirl angle θ at the exit point of the fan 2 and when the fan is operating at its maximum operational velocity. The effect being as illustrated by air flow lines F that air from the fan is redirected by the stator 6A such that it flows substantially radially across the lift producing portion of the canopy 1.

The swirl angle θ which can be ascertained by experimentation using methods known to those skilled in the art is also found to vary with distance above the canopy surface 1. This is accounted for by selecting an orientation angle which lies between the swirl angle at the canopy surface and the swirl angle at a distance corresponding to the height of the vane, typically this will also be the spacing between the shroud 3 and the canopy 1. Experimentation has shown the best orientation angle from the radial direction will depend on impeller geometry, rotational speed and radial position of stator vanes. Any angle significantly above zero will provide advantage but between 10° and 25°, and preferably between 15° and 21° is likely to best in most situations, it being understood that the aim 1s to match the angle with the swirl angle of the fan.

Improved performance of the vane 6 at lower fan speeds is found by providing the front portion of the stator 6A with a wider 'tear drop' profile.

The strength of this circumferential lift can be adjusted by varying the position of the hinged portion 6B of the vane using an adjustment mechanism as will now be described.

Figure 4:
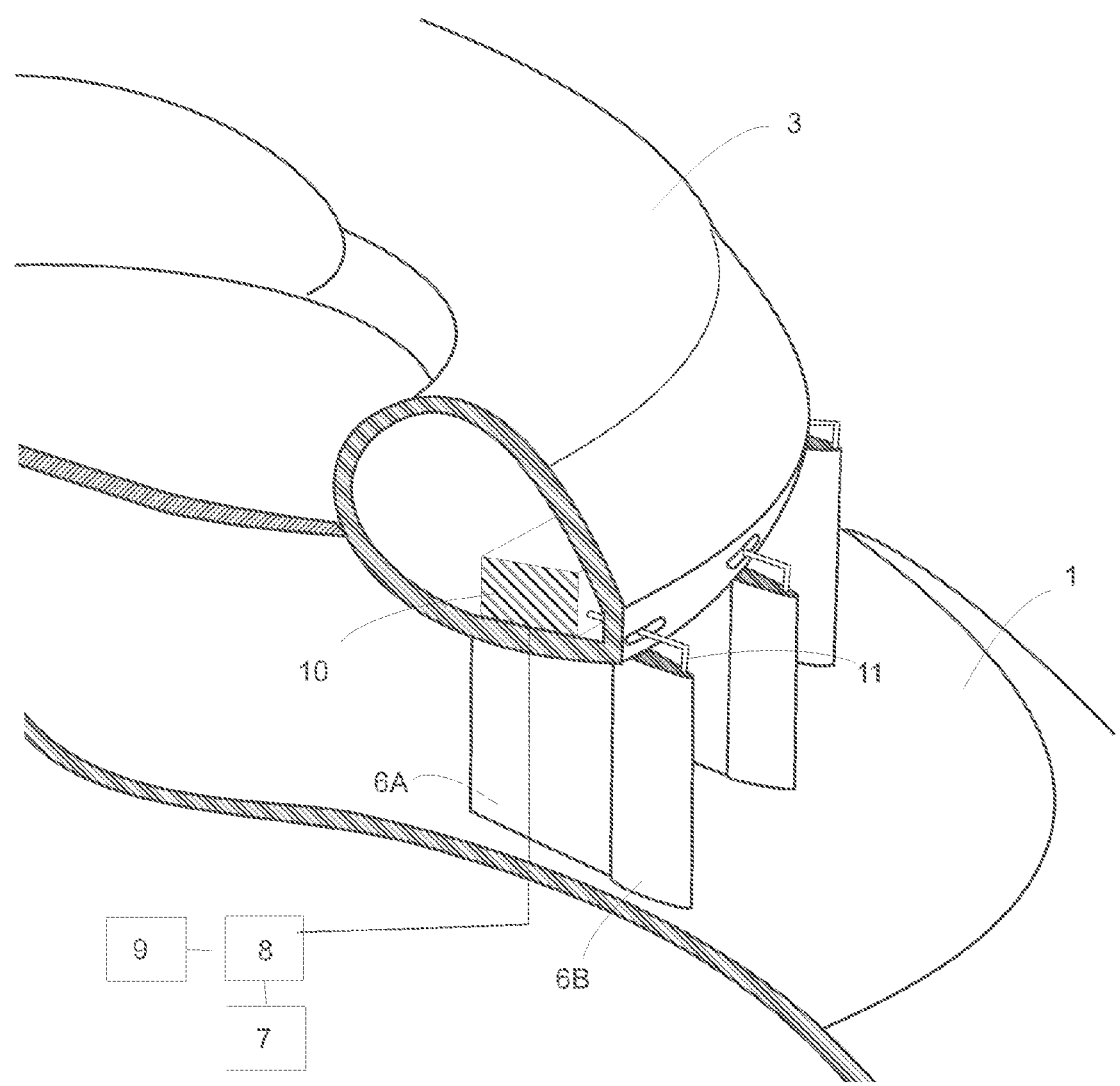
FIG. 4 is a side elevation partial cross section of the aircraft of FIG. 1.

Referring to FIG. 4, an optical or piezoelectric gyroscope 7 generates an output signal indicative of the rate of rotation of the craft about its axis X-X relative to some datum direction to which it is set on start-up. This is compared at 8 with a direction in which the craft is desired to face as indicated by a steering mechanism 9. The output of comparator 8 is an error signal which is used to control a mechanical actuator 10 housed within the shroud (only one shown) attached to the hinged vane 6B via a control rod 11. Each actuator 10 drives its associated hinged vane 6B in a clockwise or anticlockwise direction with the effect that the canopy is allowed to rotate in the clockwise direction or is driven in the opposite anticlockwise direction of arrows 8 as appropriate. Each vane 6B is controlled in exactly the same way.

Figure 5:
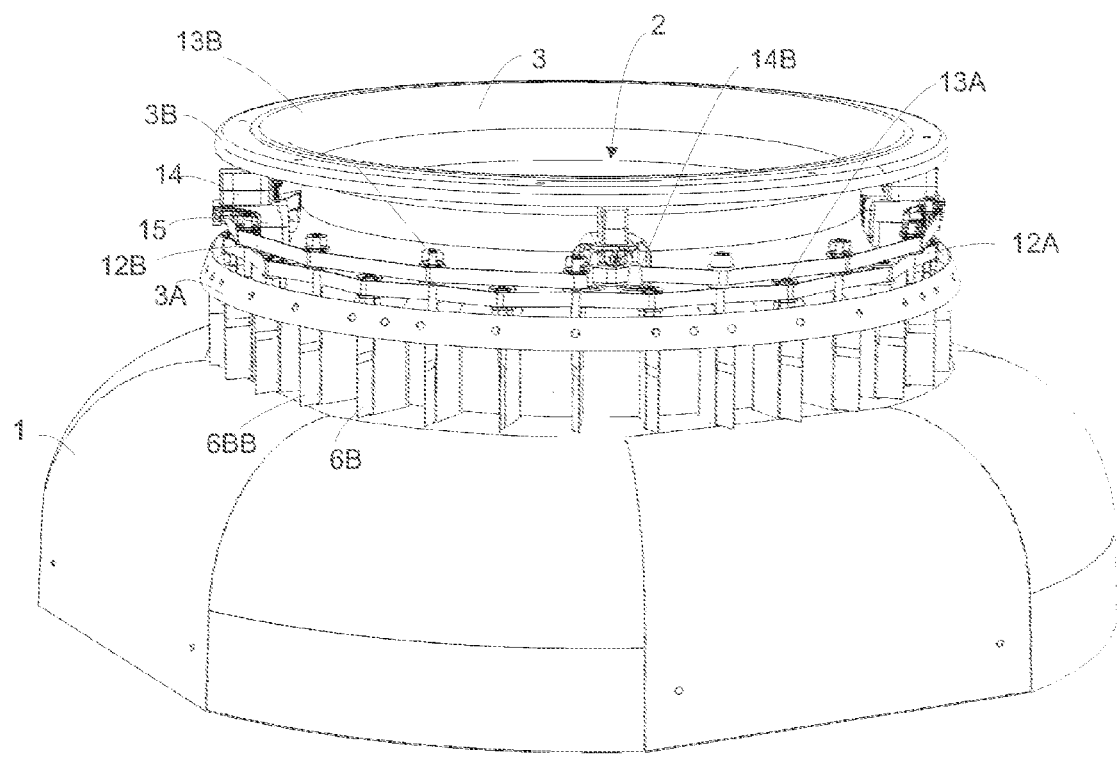
FIG. 5 is a perspective view of a vertical take-off aircraft in which the hinged vanes are operated using a belt drive.
Figure 6:
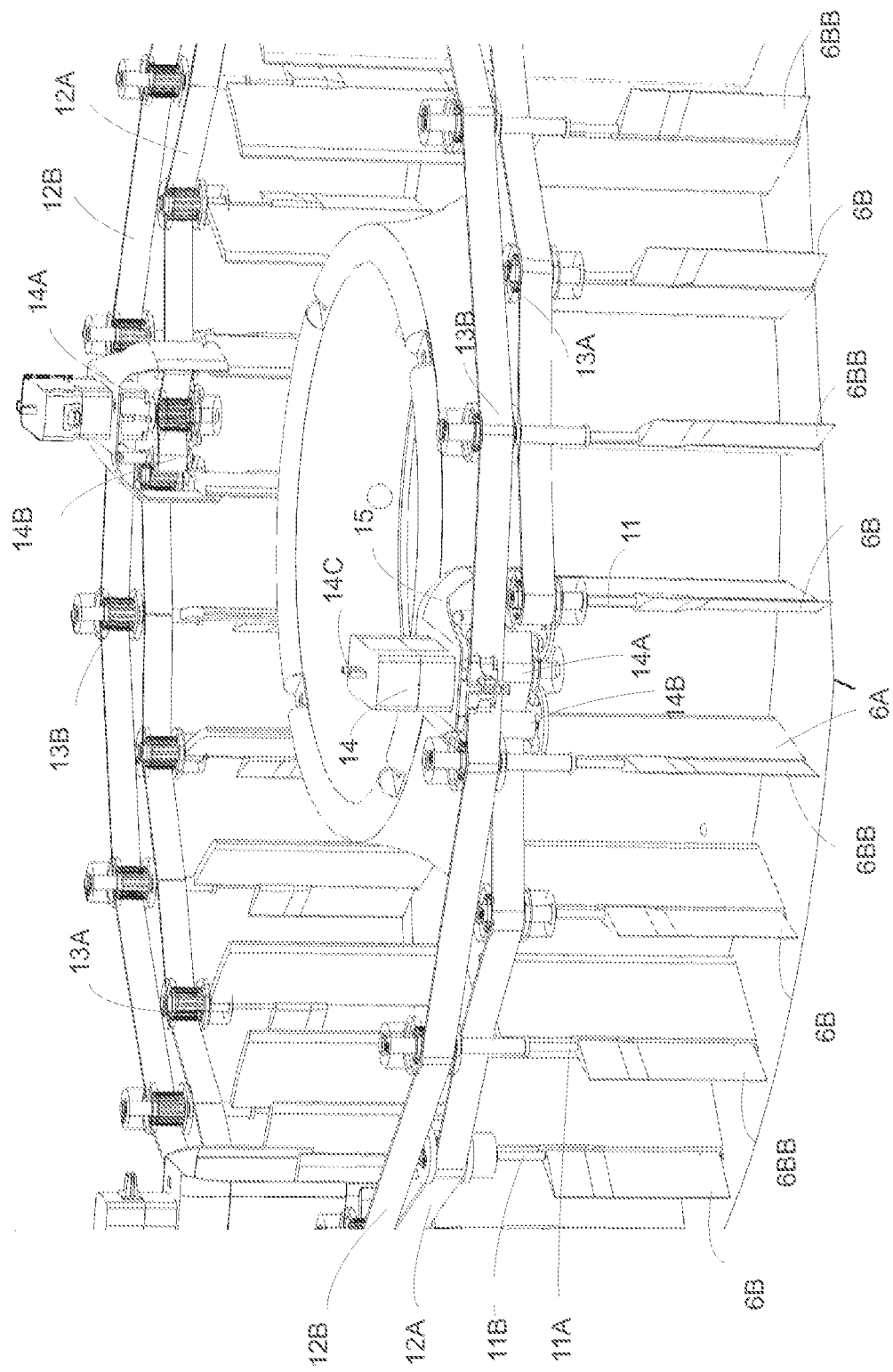
FIG. 6 is a magnified view of the craft of FIG. 5 shown with the shroud removed.

FIGS. 5 and 6 illustrate a craft having a belt driven actuating mechanism. The craft has a canopy 1, fan 2 and shroud 3 forming a duct around the fan 2. The shroud 3 is supported above the canopy by stators 6. As can be seen in FIG. 5, the wall of the shroud 3 is curved so as to form a circumferential channel housing the actuating system. The lower edge of the shroud 3 is provided with an upwardly directing circumferential lip 3A. The upper edge of the shroud 3 is provided with an outwardly extending circumferential lip 3B. A panel (not shown) may be secured to lips 3A, 3B to form an outer wall of the shroud enclosing the actuating system.

The actuating system comprises two toothed belts 12A, 12B. A first toothed belt 12A runs circumferentially about the duct and over cogs 13A associated with alternate vanes 6B. A second toothed belt 12B also runs circumferentially about the duct 2, above first belt 12A and over cogs 13B associated with alternate vanes 6BB. Cogs 13A, 13B are connected to the hinged vanes 6B, 6BB about rods 11A, 11B. Rods 11B associated with cogs 13B are relative long compared with their immediate neighbours 11A in order to allow engagement with uppermost belt 12A.

Four motors 14, two for each belt 12A, 12B, are located around the duct 2 and spaced substantially equally apart. Each motor 14 is held between two vanes 6 by way of a horseshoe shaped support 15, and to the underside of the lip 3A by fastener 14C.

Each motor 14 comprises a drive gear 14A to drive one of belts 12A, 12B, and tension gears 14B spaced on either side of drive gear 14B. Upon a signal from comparator 8, each motor 14 drives its associated belt which in causes each of cogs 13A, 13B to turn this movement being transmitted through of rods 11A, 11B so as to rotate each hinged vane 6B, 6BB simultaneously.

The motors 14 chosen are sufficiently powerful that a single motor 14 can drive a belt 12A, 12 B and one set of vanes 6B, 6BB alone. The second motor 14 provides redundancy in case one motor fails so that the vanes can still be operated. Using multiple belts means that the craft can still be sufficiently controlled so as to be landed safely in the event that one of the belt drives fail. In a less preferred embodiment, the craft may be provided with a single motor, or a single motor per belt.

As described above, in order to control yaw each of the hinged portions 6B can be varied by the same amount simultaneously. However, it is also envisaged that by selected operation of vanes 6B within different sectors of the craft it is also possible to control pitch and roll, thereby removing the need for separate flaps located at the base of the canopy which is the current method used to effect these movements.

As illustrated in FIG. 6 when it is wished to make the craft perform a pitch or roll movement, the vanes 6B in one quarter Q1 of the craft can be moved towards one another so as to create a resistance to flow of fluid over the canopy 1 in that quarter. At the same time, vanes in the diagonally opposing quarter Q3 can be moved away from one another so as to reduce the resistance to flow. This is thought to cause preferential flow of fluid over one side of the craft than the other generating greater lift on one side so as to cause the aircraft to pitch, or roll depending on which axis you are considering. Because of the rotational effect of the fan the movement is expected to occur in a direction approximately 90° from the angle of the vanes which are controlled. By reversing the vane 6B movements, i.e. to draw together vanes 6B in Q1 and to spread vanes in Q3, the opposite movement can be achieved. Movement of vanes as described above in quarters Q2 and Q4 could be used to perform yaw movements as required.

Figure 7:
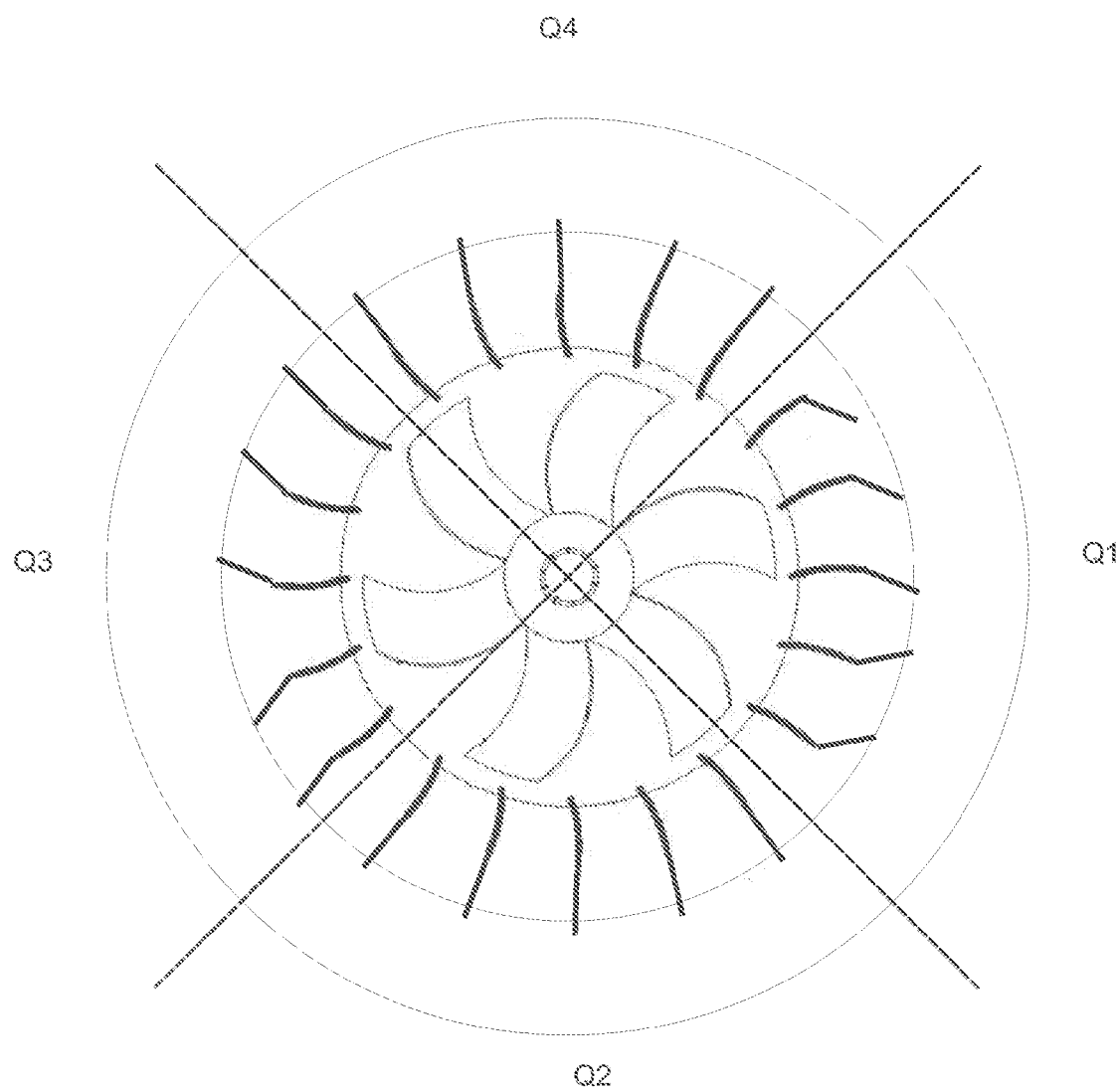
FIG. 7 is a plan view of the craft illustrating a positioning of vanes in order to effect roll or pitch of the craft.
Figure 8:
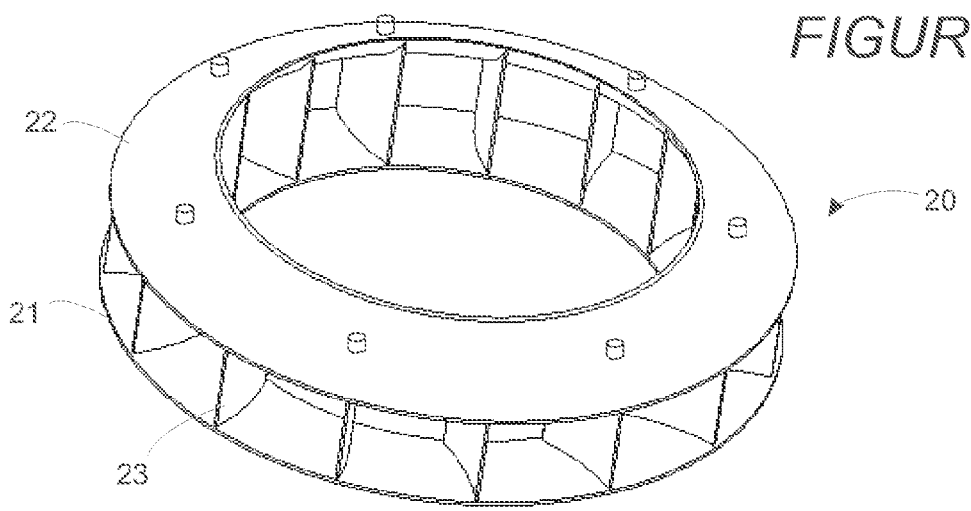
FIG. 8 is a perspective view of a vane cassette.
Figure 9:
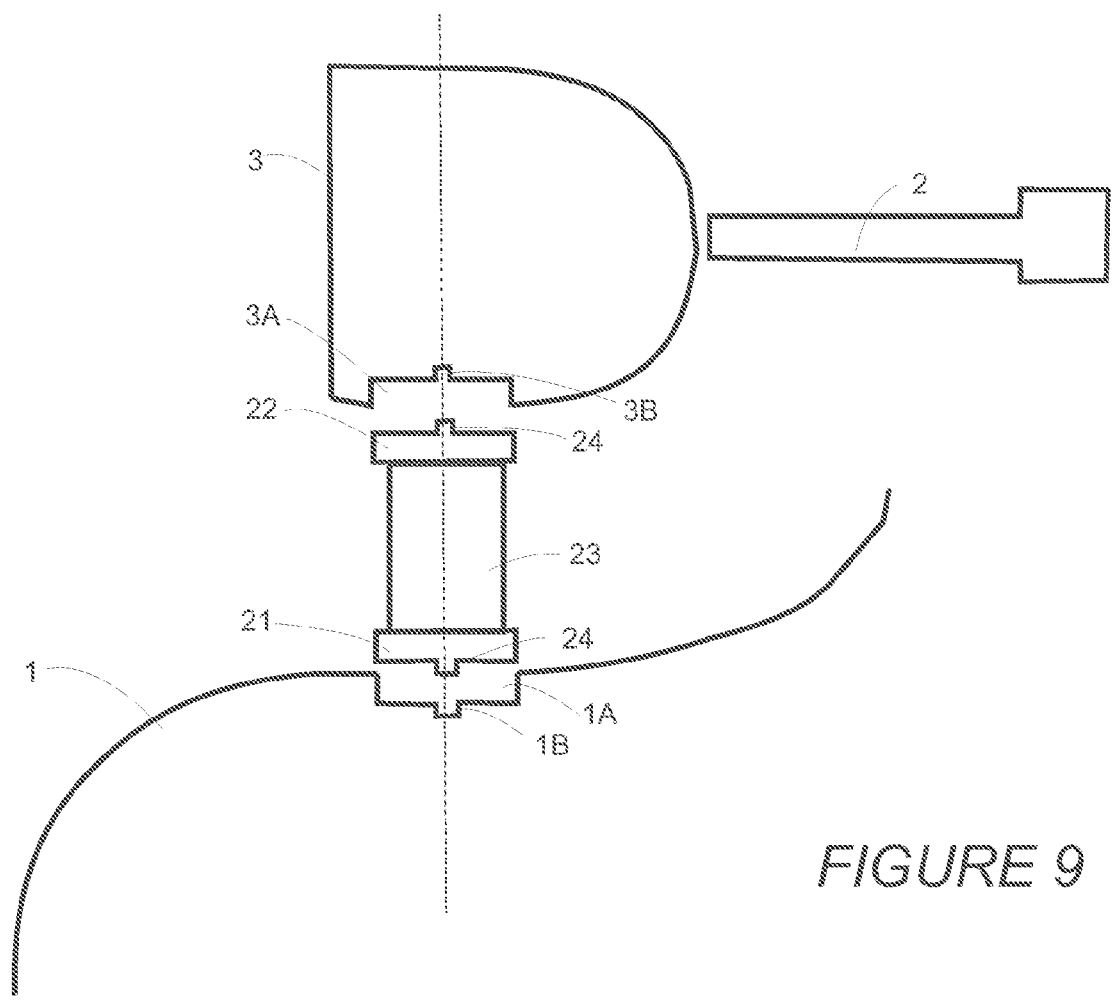
FIG. 9 is an exploded side elevation cross section illustrating shaping of the shroud and canopy to accept the vane cassette of FIG. 8.

FIGS. 7 & 8 relate to a form in which the vanes can be manufactured and assembled onto the craft. FIG. 6 illustrates a cassette 20 comprising two co-axial circular plates 21, 22 between which are interposed vanes 23 which may take the form as described above, though are shown in FIG. 6 without hinged portions. The cassette 20 may be formed from any one of a variety of methods, for example the vanes 23 and one or both of plates 21, 22 may be formed as a single integral piece using a casting or moulding process. Alternatively, the plates 21, 22 and vanes 23 may be formed separately and joined mechanically using any one of many techniques known to those skilled in the art.

Referring to FIG. 8 the upper surface of the canopy 1 and the lower surface of shroud 3 are formed with circumferential recesses 1A, 3A into which plates 21 and 22 are housed. The recesses 1A, 3A being sized such that the inner surfaces of the plates 21A, 22A, i.e. the surfaces proximate the vanes, lie flush with the canopy 1 and shroud 3 respectively. During assembly of the craft, plate 21 is located within circumferential recesses 1A. To secure the cassette to craft and to provide correct registration thereto, dowels 24 formed on the outer surfaces of plates 21, 22 are located into respective recesses 1B, 3B in the canopy 1 and shroud 3.

It will be appreciated that the above embodiment is only exemplary. For example it may be desirable to use a radial fan or other form of impeller to produce the air flow.

The stator vane may not be used to support the shroud 3 to the canopy 1 but rather additional struts may be employed for this function.

Rather than a belt, a chain, web or other suitable elongate medium which can act as a transmission between the motors and the vanes may be used. The use of the term 'belt' within the claims is used to include these alternatives.

The invention claimed is:

1. A coanda craft, comprising:
an impeller for generating a jet of fluid, the axis of the impeller defining an axial direction, and the jet of fluid defining a radial direction;
a canopy having a lift producing surface positioned with respect to the impeller and shaped to divert the jet to flow from a substantially radial direction towards a substantially axial direction; and
an aerofoil control surface separate from the impeller, the aerofoil control surface including:
a non-moveable air flow vane affixed to the canopy, at least a portion of the non-moveable air flow vane positioned upstream of the lift producing surface and having an upstream portion and a downstream portion, the upstream portion angled away from the radial direction, the downstream portion oriented in substantially the radial direction; and
a hinged air flow vane positioned adjacent the non-moveable air flow vane and configured to pivot with respect to the non-moveable air flow vane.

2. A craft according to claim 1, further including a shroud which extends circumferentially about the impeller defining a duct within which the impeller resides.

3. A craft according to claim 2 wherein the shroud is supported upon a canopy defining the curved surface and that the aerofoil control surface is located between the shroud and the canopy.

4. A craft according to claim 3 wherein the non-moveable airflow vanes perform the function of struts to support the shroud with respect to the canopy.

5. A craft according to claim 2 wherein the impeller is arranged to draw fluid from above the curved surface.

6. The craft of claim 1, wherein the orientation of the upstream portion is at an angle between 10 and 20 degrees from the radial flow direction.

7. The craft of claim 1, wherein the orientation of the upstream portion is at an angle between 15 and 21 degrees from the radial flow direction.

8. A craft according to claim 1, wherein the hinged vanes are divided into at least two sets, and the actuating system comprises a first belt running between belt engagements of hinged portions of a first set of vanes and a second belt running between belt engagements of hinged portions of a second set of vanes.

9. A craft according to claim 8 wherein the vanes of the first and second sets of vanes are arranged alternately around the canopy.

10. The craft of claim 1, further comprising an actuating system configured to rotate the hinged vanes, the actuating system being housed substantially within the shroud.

11. A method of controlling a flight orientation of a Coanda craft having an impeller for generating a jet of fluid and means for causing it to flow over a curved surface including a lift producing surface, the axis of the impeller defining an axial direction, and the jet of fluid defining a radical direction, the method comprising:
selectively pivoting a plurality of aerofoil control surfaces each having a fixed vane and a pivoting vane, the control surfaces spaced separate from the impeller and positioned circumferentially around an outlet of the impeller, at least a portion of the fixed vane positioned upstream of the lift producing surface to control jet flow along the radial direction, the fixed vane having an upstream portion and a downstream portion, the upstream portion angled away from the radial direction, the downstream portion oriented in substantially the radial direction; and
an adjusting mechanism for pivoting the pivoting vanes to control spin of the vehicle, the mechanism enabling a differential of flow over one portion of the radial portion of the curved surface as compared with another portion of the radial portion of the curved surface to thereby enable control of a flight orientation of the craft.

12. The craft of claim 1, wherein the aerofoil control surface is secured within a cassette including aerofoil control surfaces interposed between coaxial supporting members.

13. The craft of claim 12, in which the canopy includes a circumferential recess into which the supporting members are located.

14. The craft of claim 1, wherein the canopy includes a shroud defining a housing, the craft further including an actuating system disposed within the housing, the actuating system configured for controlling a pivoting of sets of pivoting air flow vanes.

15. An aircraft, comprising:
an impeller for generating a jet of fluid, the axis of the impeller defining an axial direction, and the jet of fluid defining a radial direction;
an airflow surface using the coanda effect and including a lift producing portion;
a plurality of air flow vanes radially disposed about and not connected to the impeller to control airflow exiting the impeller along the radial direction, one or more of the plurality of vanes including:
a fixed vane positioned upstream of the lift producing portion and having an upstream portion and a downstream portion, the upstream portion angled away from the radial direction, the downstream portion oriented in substantially the radial direction; and
a hinged vane connected to the fixed vane to be downstream of the fixed vane and adjustable with respect to the fixed vane to thereby direct a flow of fluid emanating from the impeller to stabilize the aircraft.

16. The aircraft of claim 15, wherein there are a plurality of hinged vanes forming at least two independently adjustable sets, the craft further including:
- at least two belts, each belt controllably joining vanes of a set;
- an actuator for driving each of the at least two belts.

17. The aircraft of claim 16, further including a shroud forming a housing for the belts and the actuator, the hinged vanes hingedly secured between the airflow surface and the shroud.

18. The aircraft of claim 15, the hinged vane pivotally connected to the fixed vane.

19. The aircraft of claim 15, further including a transmission configured to pivot sets of hinged vanes, the transmission connected to hinged vanes by a member of the group consisting of belt, chain, web, elongate medium.

20. The craft of claim 1, wherein the non-moveable air flow vanes are oriented to be aligned with the swirl angle $\theta$ at the exit point of the impeller.

21. The aircraft of claim 15, further comprising an actuator, a plurality of belt engagements each associated with a hinged airflow vane, and a belt running between the actuator and the plurality of belt engagements.

\* \* \* \* \*